United States Patent [19]

Sondov et al.

[11] Patent Number: 4,681,688

[45] Date of Patent: Jul. 21, 1987

[54] TUBULAR TRASH NET FOR PRE-TREATING SEWAGE, WITH REPLACEABLE NET CASSETTE

[75] Inventors: Sten Y. Sondov; Jan O. From, both of Oslo, Norway

[73] Assignee: Interpublic a.s, Oslo, Norway

[21] Appl. No.: 827,965

[22] PCT Filed: May 31, 1985

[86] PCT No.: PCT/N085/00030

§ 371 Date: Jan. 28, 1986

§ 102(e) Date: Jan. 28, 1986

[87] PCT Pub. No.: WO85/05616

PCT Pub. Date: Dec. 19, 1985

[30] Foreign Application Priority Data

Jun. 1, 1984 [NO] Norway .................................. 842200

[51] Int. Cl.$^4$ ........................ B01D 33/00; C02F 11/12
[52] U.S. Cl. .................................. 210/770; 210/780;
210/741; 210/91; 210/137; 210/237; 210/386;
210/387
[58] Field of Search ............ 210/137, 232, 237, 323.2,
210/386, 387, 741, 770, 780, 111, 85, 91;
100/37, 120

[56] References Cited

U.S. PATENT DOCUMENTS

| | | |
|---|---|---|
| 3,282,430 | 11/1966 | Kinne . |
| 3,399,778 | 9/1968 | O'Neill .............................. 210/387 |
| 3,747,766 | 7/1973 | Brooks .............................. 210/304 |
| 4,131,546 | 12/1978 | Olsson et al. ...................... 210/780 |
| 4,260,496 | 4/1981 | Beer .................................. 210/387 |

FOREIGN PATENT DOCUMENTS 2383130 10/1978 France .............................. 210/323.2

*Primary Examiner*—Richard V. Fisher
*Assistant Examiner*—Linda S. Evans
*Attorney, Agent, or Firm*—James F. Davis; James R. Shay

[57] ABSTRACT

The tubular trash net is a cleaning and collecting device for pre-treatment of sewage, where the water which is to be separated from waste trash materials is led through a collecting net (8), after which the net (8) containing the separated trash is drawn through mechanically-driven rollers (10) which simultaneously de-water the trash prior to its being conveyed, together with the used net (8), to a container for disposal, while runoff pre-treated water is sent on for either further treatment or deep-water outfall.

11 Claims, 2 Drawing Figures

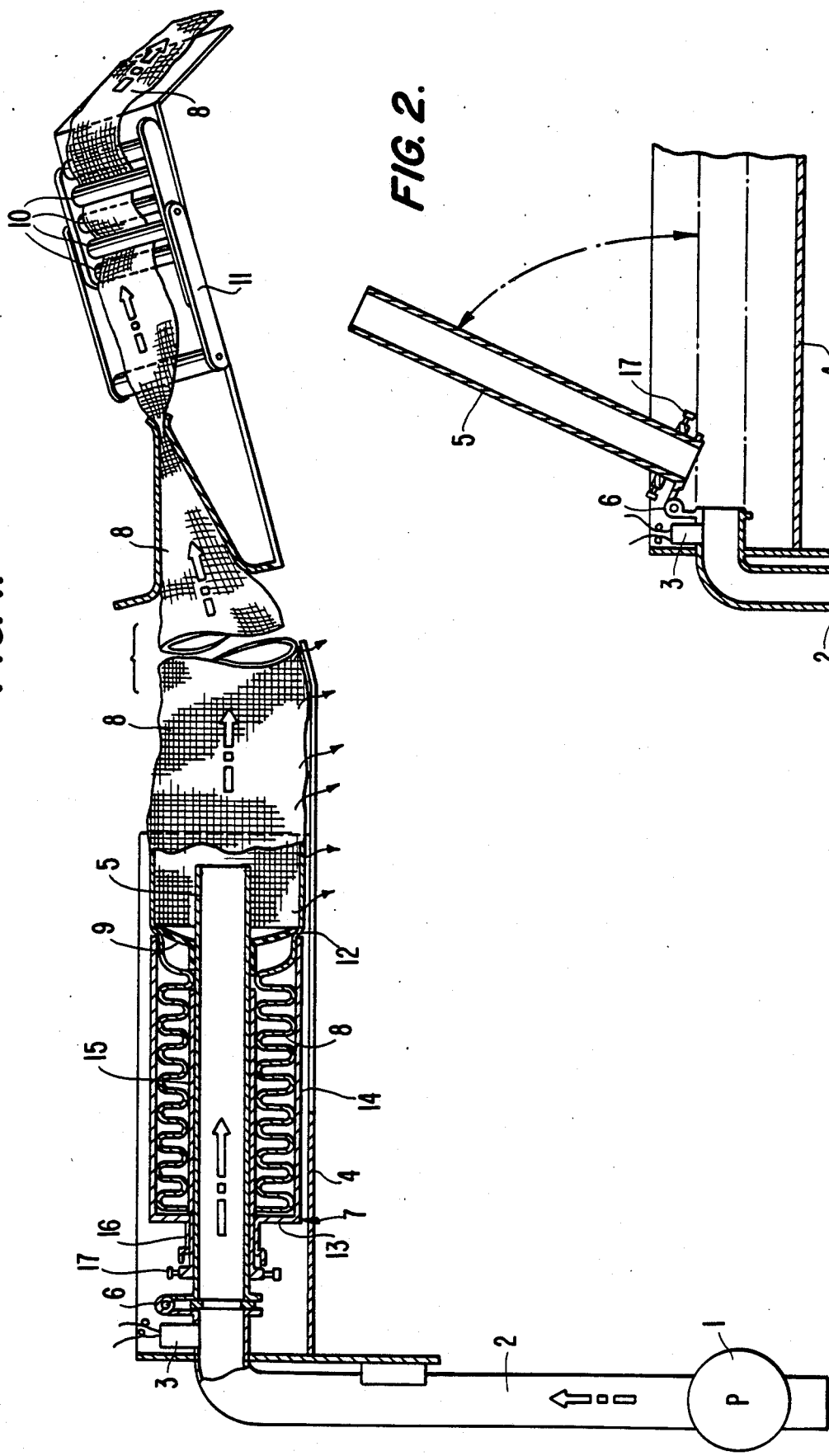
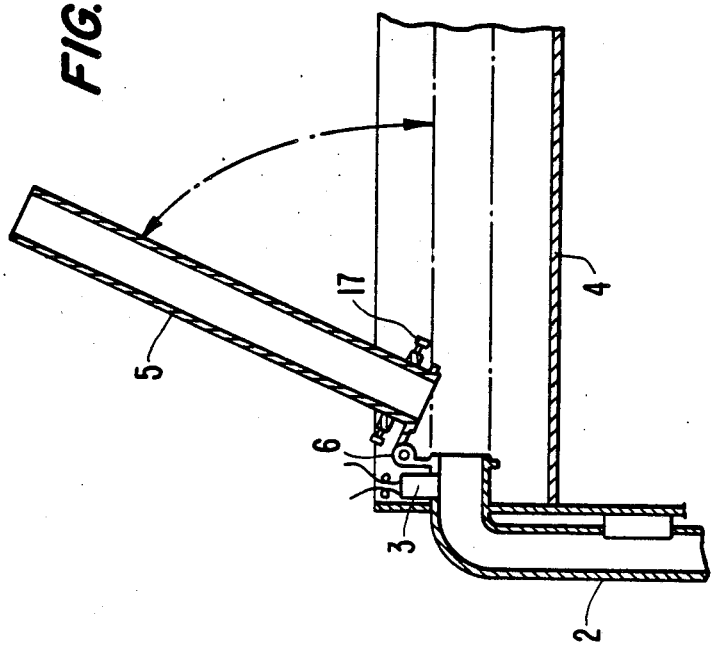

TUBULAR TRASH NET FOR PRE-TREATING SEWAGE, WITH REPLACEABLE NET CASSETTE

BACKGROUND OF THE INVENTION

In cleaning plants for sewage, the sewage will normally first flow through a raked bar-screen, which is designed to stop larger solid waste particles such as textiles, plastic, cigarette butts etc. which are carried in by the sewage. Such coarse waste can easily clog drain outlets, pumps and valves, etc.

A typical raked bar-screen consists of flat steel strips placed parallel to each other across the sewage inlet, at an angle to the inlet flow direction. The sewage is forced through the parallel bars, where openings normally vary from 15 to 25 mm. The coarse trash material is deposited around the bars and is removed at necessary intervals by a rake with teeth which fit between the bars, which is drawn up from the bottom of the bar-screen and rakes the trash up over the water-level and deposits it on a conveyor belt, whereas in larger installations the trash will be transported to a de-watering unit in order to press out most of the water content.

There are other methods for separating trash from the sewage, e.g. by diverting the sewage over a strainer unit which has openings of approximately 1 mm., so that the sewage water passes on through while the wet trash slides down the strainer due to its own weight, and is transported on a conveyor belt to a disposal container, in some cases being first run through a de-watering unit.

If one further wishes to remove small trash particles remaining in the sewage, traditional sediment-collecting basins must be used in addition to the bar-screen or strainer. The above-mentioned screens or strainers are normally the first stages in the cleaning process, coming before the sewage is diverted on either to a sediment-collector or to a deep-water outfall distributor pipeline (clogging can occur if the above trash removal is neglected).

The raked bar-screen has the disadvantage that coarse trash particles, threads, string, bits of stockings, etc. can pass on through the screen, since the length of the openings is considerably greater than their width. Due to the relatively small area of the openings themselves, the average speed of the sewage through the bars is high, which reduces the screen's effectiveness in separating solid trash from sewage. The most effective solution for the screen principle would be to use square openings in the screen, for example 10×10 mm. or 15×15 mm., etc., but this arrangement does not allow raking the trash away from the screen because of the limitations of current technology.

Screens, strainers etc. also have the great disadvantage that they must be constructed in a series of mechanical units, each with its own separate power drive: the screen with its raking arm, a convey belt transport unit, a de-watering unit, and in many cases an additional conveyor belt leading to a disposal container.

SUMMARY OF THE INVENTION

The invention described below—the tubular trash net unit for pre-treating sewage—replaces all of the above units with a single device, and in addition can achieve a much higher efficiency in removing solid trash from sewage water. The invention relates to a method and device for separating, transporting and dewatering coarse solid particles suspended in water. According to the preferred embodiment of the invention, untreated sewage flows out of a discharge pipe into an open-ended tubular net. As the water flows through, the net traps coarse solid particles suspended in the water. A mechanism is provided for advancing the net to expose new net surfaces to the flow and for dewatering the solid particles trapped in the net. Details of operation will be explained below, with numbers which refer to the enclosed drawings.

BRIEF DESCRIPTION OF THE DRAWINGS

FIG. 1 is an elevational view of the preferred embodiment of this invention; and FIG. 2 is a detailed view demonstrating the cassette changing feature of the preferred embodiment.

DESCRIPTION OF THE PREFERRED EMBODIMENT

With reference to FIG. 1, a conduit (2) communicates with an inlet pipe (5) disposed within a drainage canal (4). Mounted on the inlet pipe (5) is a trash net cassette (7) containing therein one end of a folded tubular net (8). In the preferred embodiment, the cassette (') has an open end (12) and a closed end (13). The cassette (7) is formed with an outer cylinder (14) and an inner cylinder (15), the inner cylinder (15) being longitudinally shorter than cylinder (14). The unused portion of the net (8) is stored between cylinders (14) and (15). A collar (16) is formed at the closed end (13) of the cassette (7) and is adapted to slidingly engage inlet pipe (5). The cassette (7) may be attached to inlet pipe (5) by any known means, such as by bolts (17). An adjustable friction sleeve (9) is disposed in the open end (12) of the cassette (7) and extends radially outwardly from inlet pipe (5t) to outer cylinder (14). In the preferred embodiment, sleeve (9) is formed of rubber. The other end of the tubular net (8) is diposed in a system of two or three mechanically driven rollers (10) above the water surface. The rollers (10) are supported by support arm (11).

In operation, sewage is pumped to the tubular trash net (8), as indicated in FIG. 1, by the pump (1) through the conduit (2) and inlet pipe (5), but may also be led into the net using gravity flow from above. The tubular trash net (8) lies submerged in the drainage canal (4) and separates unwanted trash materials from the sewage. The net (8) contains an active screening portion located between the point where the net emerges from the replaceable storage cassette (7) and the point where the net is drawn above the surface of the water in the drainage canal (4). The tubular net (8) has two open ends and is provided with a large enough mesh size such that the initial head loss of the water flowing through the net is negligible. As the net traps solid particles, the mesh openings fill up, and the open end of the net farthest from the cassette (7) substantially closes, forcing inflowing water to circulate back and the screened in the section of the net nearest to the water inlet pipe (5). Preferred mesh sizes are in the range of 5×5 mm to 25×25 mm. The mechanically driven rollers (10) apply pressure to the net (8) and function to drawn and dewater the net and the trash materials the net contains. A pressure gauge/pressostat (3) is placed near the inlet and sends an electrical impulse to the mechanically driven rollers (10) when pressure build-up in the inlet section exceeds the desired level. The rollers (10) draw the net (8) out of the cassette (7) continuously or in stages in response to this signal to expose raw and unrestricted net screening area to the the water flow. The net (8) is drawn out of the cassette between friction sleeve (9) and outer cylinder (14). In the preferred embodiment, the desired pressure level is in the range of 0-0.3 bar. A drainage canal (4) leads runoff water from the trash net to the next stage of processing or outflow. The sewage is passed on through inlet pipe (5), which is connected to the inlet pipe (2) with a hinged joint with a water-tight gasket. This arrangement allows replacing the trash net cassette (7) when the net (8), which is color-coded to indicate time for replacement, must be changed (see FIG. 2).

This can be performed by stopping the pump (1), swinging the inlet pipe (5) on its hinge (6) so that the trash net cassette (7) can come into its replacement position, the rubber friction sleeve (9) is loosened, the cassette (7) is removed and the inlet pipe (5) is ready to receive a new trash net cassette. The friction sleeve (9) is then adjusted, the tubular trash net (8) is fastened to the end of the previous net which is still in position between the rollers (10), and the trash removal process is ready to proceed once again.

We claim:

1. A method for separating, transporting and dewatering coarse solid particles suspended in water comprising the steps of:
   leading the water through a large-mesh submerged tubular net having an active screening section,
   trapping a substantial number of said coarse solid particles in said net,
   drawing the net forward with its trapped coarse solid particles up above the surface of the water which has passed through the net at a speed which is regulated by a system of rotating rollers above the water surface to provide new and unrestricted screening area,
   said active screening section being located between a replaceable storage cassette from which the large-mesh net is drawn out and the point where the net with its trapped coarse solid particles is pulled up above the water surface
   the rollers simultaneously transporting the net with its contents and dewatering the net and its contents by pressure,
   disposing the net and its contents, and replacing the nearly empty storage cassette with a new storage cassette containing a tubular net.

2. The method of claim 1, further comprising
   providing the submerged tubular net with a mesh size such that the initial pressure head loss of the water flowing through is negligible and such that the head loss increases to 0-0.3 bar as said solid particles are trapped inside the tubular net and fill up the mesh openings,
   providing the tubular net with two open ends,
   the build-up of solid particles substantially closing one said end, and
   forcing inflowing water to circulate back and be screened in the section of the net nearest to the other said end.

3. The method according to claim 1 wherein the system of rotating rollers continuously draws the net forward.

4. The method according to claim 1 wherein the system of rotating rollers draws the net forward in stages.

5. Device for separating, transporting and dewatering coarse solid particles suspended in water, comprising a replaceable net storage cassette packed with a considerable length of a tubular net with means defining square mesh openings of a size in the range of 5×5 mm to 25×25 mm, a variable friction sleeve through which said net is drawn out at an open end of the cassette to form an unfolded tubular screening area for unrestricted throughflow of water, a pressure gauge which monitors water inflow pressure disposed upstream of the net, and a system of two or three mechanically-driven rollers that draw the net out automatically from the cassette in response to signals from the pressure gauge, the rollers simultaneously dewatering suspended solids trapped inside the tubular net due to the low rotating speed and variable pressure applied to the net by the rollers.

6. The device described in claim 5 further comprising an inlet pipe disposed upstream of the net, said inlet pipe functioning as the support for the replaceable net storage cassette through which water is led into the tubular screening net in its horizontal, submerged position, said inlet pipe having a hinged joint disposed on one end, so that said inlet pipe can be hoisted up at a vertical angle due to said hinged joint, so that the cassette can be pulled up over the water level while water inflow is temporarily stopped, and the nearly empty cassette can easily be replaced by a new one.

7. Device for separating, transporting and dewatering coarse solid particles suspended in water comprising:
   a hinged inlet pipe disposed within a drainage canal;
   a replaceable net storage cassette disposed on said inlet pipe;
   a tubular large mesh net having two open ends, one of said open ends being disposed in said cassette;
   means for introducing water into said inlet pipe; and
   means for drawing said tubular net forward out of said cassette and through said drainage canal, the other open end of said net being contacted by said drawing means.

8. The device according to claim 7 further comprising a pressure control means for activating said drawing means in response to a predetermined pressure in said inlet pipe.

9. The device according to claim 8 wherein said drawing means comprises mechanically driven rollers disposed above said drainage canal which function to draw said net forward out of said cassette and to dewater said net.

10. The device according to claim 9 further comprising color coding means integral with said net for indicating the need to replace said net.

11. Device for separating, transporting and dewatering coarse solid particles suspended in water comprising:
    a hinged inlet pipe having two ends disposed within a drainage canal;
    means for introducing water into said inlet pipe;
    a tubular large mesh net having two open ends, one of said open ends disposed around one end of said inlet pipe;
    mechanically driven roller means disposed above said drainage canal, the other open end of said net being contacted by said roller means; and
    pressure control means for activating said roller means in response to a predetermined pressure in said inlet pipe;
    said roller means functioning to draw said net forward from said inlet pipe and to dewater said net.

* * * * *

UNITED STATES PATENT AND TRADEMARK OFFICE
CERTIFICATE OF CORRECTION

PATENT NO. : 4,681,688
DATED : July 21, 1987
INVENTOR(S) : Sondov et al.

It is certified that error appears in the above—identified patent and that said Letters Patent is hereby corrected as shown below:

Col. 2, line 23, "(')" has been deleted and --(7)-- has been inserted in its place;
Col. 2, line 36, "(5t)" has been deleted and --(5)-- has been inserted in its place;
Col. 2, line 61, "drawn" has been deleted and --draw-- has been inserted in its place;
Col. 2, line 68, "raw" has been deleted and --new-- has been inserted in its place.

Signed and Sealed this

Third Day of November, 1987

*Attest:*

DONALD J. QUIGG

*Attesting Officer*   *Commissioner of Patents and Trademarks*